United States Patent [19]
Kaetsu et al.

[11] Patent Number: 5,412,497
[45] Date of Patent: May 2, 1995

[54] OPTICAL COMMUNICATION DEVICE WITH OPTICAL MODULES AND OPTICAL FIBER SUPPORTING PLATES

[75] Inventors: Mitsuo Kaetsu; Noboru Nakama; Kazuaki Kashiwada, all of Kawasaki, Japan

[73] Assignee: Fujitsu Limited, Kawasaki, Japan

[21] Appl. No.: 20,406

[22] Filed: Feb. 22, 1993

[30] Foreign Application Priority Data

Feb. 24, 1992 [JP] Japan ................... 4-036289
Feb. 24, 1992 [JP] Japan ................... 4-036295

[51] Int. Cl.⁶ .............................................. H04B 10/00
[52] U.S. Cl. .................................... 359/163; 359/162; 385/134; 385/135
[58] Field of Search .................. 355/123, 134, 135; 359/162, 163; 361/600, 602

[56] References Cited

U.S. PATENT DOCUMENTS

| | | | |
|---|---|---|---|
| 5,138,688 | 8/1992 | Debortoli | 385/135 |
| 5,265,186 | 11/1993 | Fishkin et al. | 385/135 |
| 5,265,187 | 11/1993 | Morin et al. | 385/135 |
| 5,274,731 | 12/1993 | White | 385/135 |
| 5,353,367 | 10/1994 | Czosnowski et al. | 385/134 |

FOREIGN PATENT DOCUMENTS

| | | | |
|---|---|---|---|
| 0434530 | 6/1991 | France | 385/135 |
| 3-171796 | 7/1991 | Japan | H05K 7/00 |
| 2198549 | 6/1988 | United Kingdom | 385/135 |

Primary Examiner—David K. Moore
Assistant Examiner—Rafael Bacares
Attorney, Agent, or Firm—Armstrong, Westerman, Hattori, McLeland & Naughton

[57] ABSTRACT

An optical communication device comprising a horizontally rectangular main shelf, and a horizontally rectangular sub-shelf arranged in a vertically overlapping relationship with the first shelf. The main shelf and the sub-shelf have parallel guide rails in register with each other. Unit plates comprising optical modules for optical-electrical signal conversion are inserted in the main shelf in upright positions for engagement with the respective guide rails. Optical fiber supporting plates having means for supporting the optical fiber having a surplus length portion coiled in a freely extendable manner are inserted in the sub-shelf in upright positions for engagement with the respective guide rails. Accordingly, the surplus length portions of the optical fibers are orderly arranged in correspondence with the optical modules so as to prevent an incorrect connection between the optical fibers and the optical modules.

12 Claims, 9 Drawing Sheets

OPTICAL COMMUNICATION DEVICE WITH OPTICAL MODULES AND OPTICAL FIBER SUPPORTING PLATES

BACKGROUND OF THE INVENTION

1. Field of the Invention

The present invention relates to an optical communication device in an optical communication system such as a telephone exchange system and in particular, the present invention relates to an optical communication device including a main shelf with unit plates having optical modules and a sub-shelf with optical fiber supporting plates.

2. Description of the Related Art

Recently, optical fibers have often been used in telephone communication systems, for example, between regional telephone exchange stations. The telephone exchange unit includes, as a part thereof, an optical communication device comprising unit plates including electronic components and optical modules. The optical modules are optical-electrical converters that receive optical signals from optical fibers and convert them into electrical signals, and also receive electric signals and convert them into optical signals for transmittance by optical fibers. Electrical signals are treated within the exchange unit.

Connectors are attached to the ends of optical fibers that are not cut near the end thereof and usually have surplus length portions near the ends thereof that are considerably longer than the length necessary to achieve a connection between the optical modules and thus the surplus length portions are coiled in a freely extendable manner in situ.

Japanese Unexamined Patent Publication (Kokai) No. 3-171796 discloses an optical communication device including unit plates having optical modules in which optical fibers having surplus length portions coiled in a freely extendable manner are connected to the optical modules. In this prior art, unit plates are arranged in the shelf of a housing parallel to each other in upright positions. A bundle of the optical fibers introduced in the housing and coiled surplus length portions of the optical fibers are rested on top of the shelf and the ends of two optical fibers are connected to each of the optical modules.

Recently, optical communication has developed and the number of unit plates with optical modules per one optical communication device has increased. Also, optical fibers are used between the unattendant center and telephone subscribers. In this case, numerous optical modules and optical fibers are necessary, and when many unit plates with optical modules are housed in one optical communication device, a problem occurs in that the optical fibers may be incorrectly connected to the optical modules if the coiled surplus length portions of the optical fibers are layered one above the other out of order.

SUMMARY OF THE INVENTION

The object of the present invention is to solve the above described problem and to provide an optical communication device including unit plates having electronic components and optical modules in which surplus length portions of optical fibers can be arranged in correspondence with the optical modules.

According to the present invention, there is provided an optical communication device comprising a housing having a horizontal line, a first shelf having a plurality of guide rails extending parallel to each other and to the horizontal line, and a second shelf arranged in a vertically overlapping relationship with the first shelf and having a plurality of guide rails extending parallel to each other and to the horizontal line in register with the guide rails of the first shelf, a first set of unit plates comprising wiring circuit boards having optical modules, respectively; the unit plates being inserted in the first shelf in upright positions for drawable engagement with the respective guide rails; and a second set of optical fiber supporting plates inserted in the second shelf in upright positions for drawable engagement with the respective guide rails; each of the optical fiber supporting plates having a means for supporting at least one optical fiber having a surplus length portion coiled in a freely extendable manner for connection to the optical module of each of the unit plates.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 3:
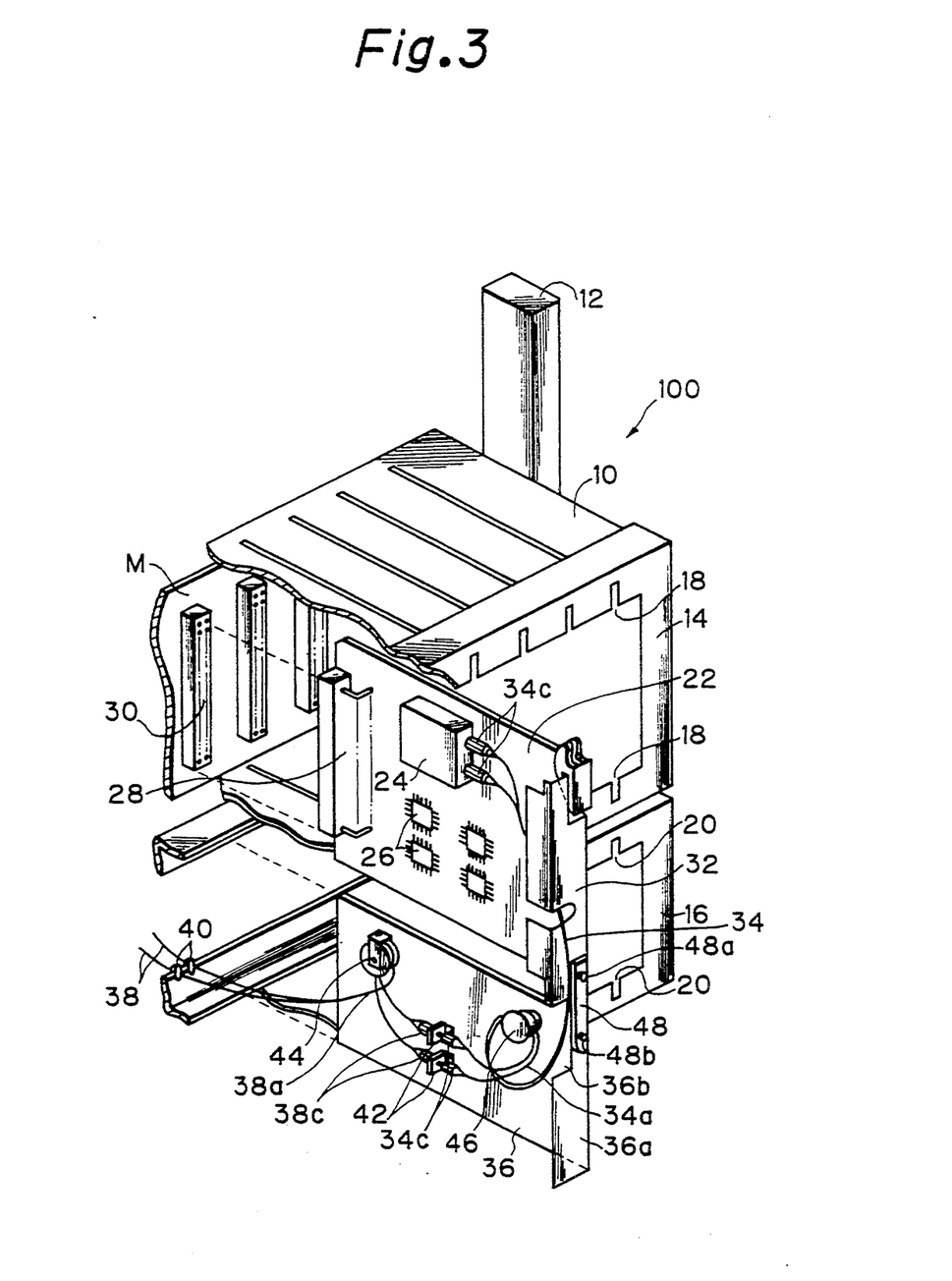
FIG. 3 is a view similar to FIG. 2 but showing the unit plate and the optical fiber supporting plate in drawn positions.
Figure 4:
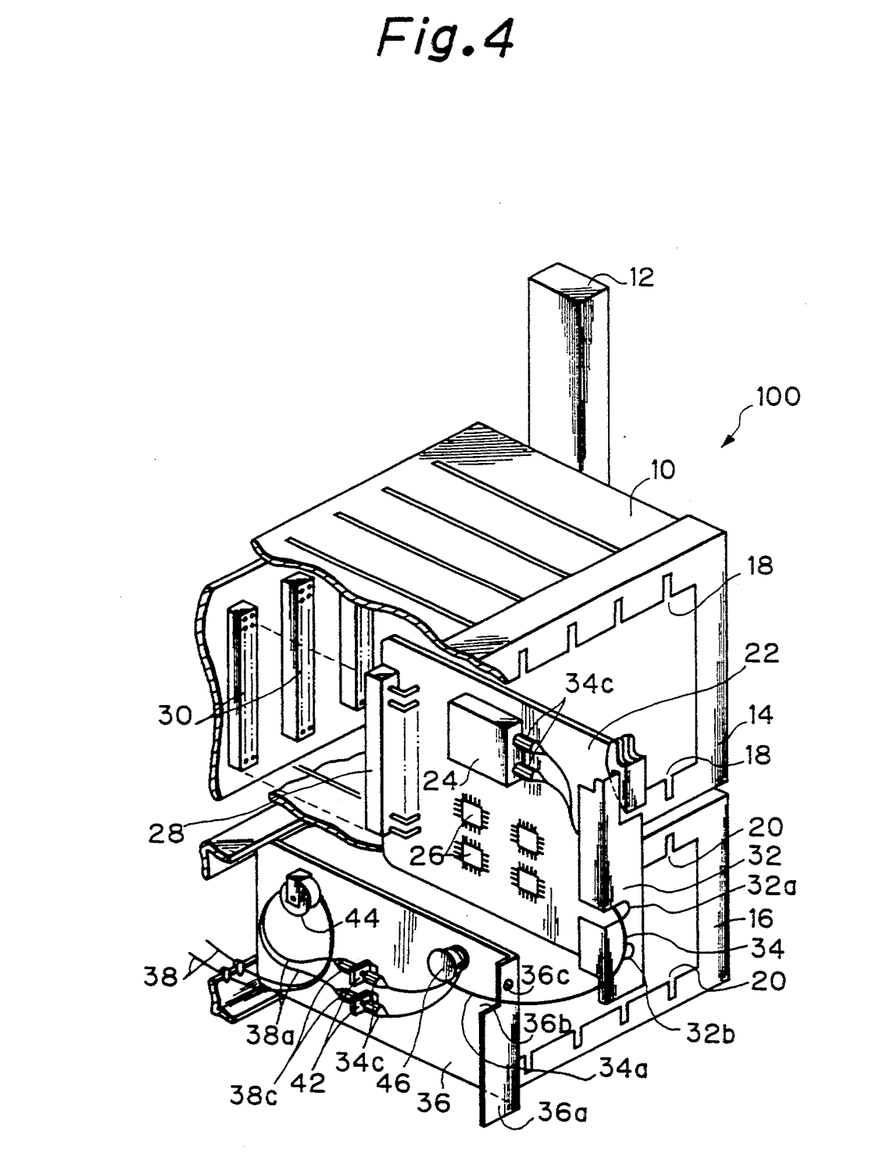
FIG. 4 is a view similar to FIG. 3 but showing the unit plate in a drawn position and the optical fiber supporting plate in an inserted position.
Figure 5:
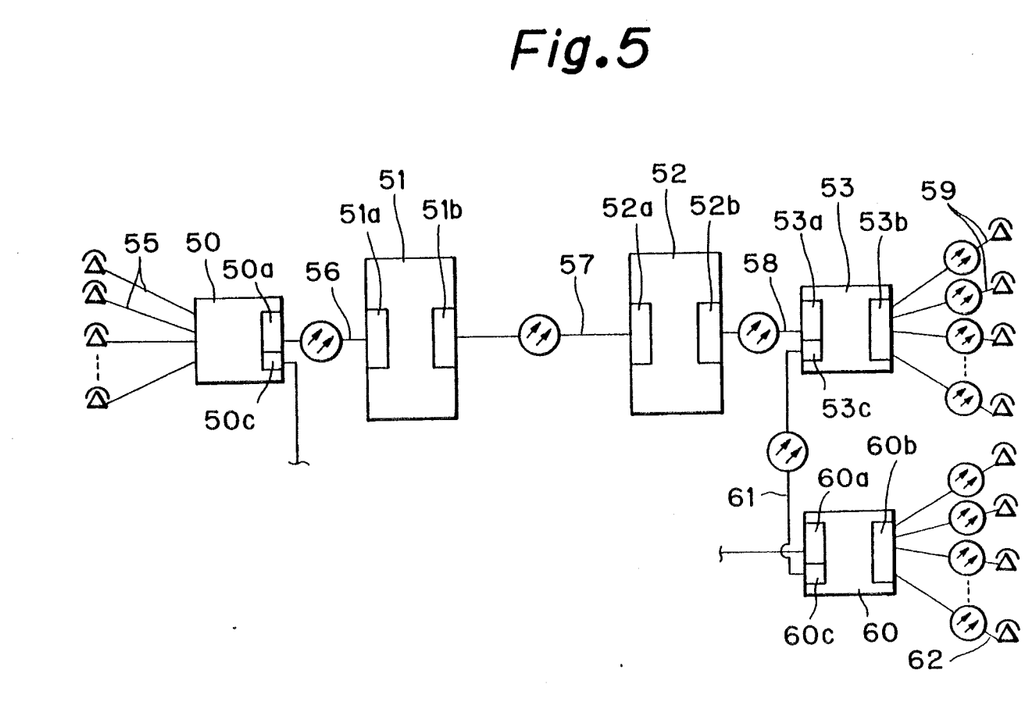
FIG. 5 is a diagram illustrating a telephone communication system in which the device of FIGS. 1 to 4 and the device of FIGS. 6 to 10C are used.

FIGS. 1 to 4 show an optical communication device 100 and FIGS. 6 to 10C show an optical communication system shown in FIG. 5.

In FIG. 5, the telephone communication system comprising local unattendant telephone exchange centers 50 and 53, and regional telephone exchange stations 51 and 52. The center 50 is connected to telephone subscribers by conductive lines 55. The center 50, the stations 51 and 52, and the center 53 are interconnected by optical fibers 56, 57 and 58, respectively. The center 53 is connected to telephone subscribers by optical fibers 59.

The center 50, the stations 51 and 52, and the center 53 have telephone exchange units that include, as a part thereof, optical communication devices 50a, 50c, 51a, 51*b*, 52*a*, 52*b*, 53*a*, 53*b* and 53*c*, respectively. Each of these optical communication devices receive optical signals from the optical fibers and convert them into electrical signals that are dealt with in the telephone exchange units, and also receive electric signals from the telephone exchange units and convert them into optical signals that are transmitted through the optical fibers. There are further local unattendant telephone exchange centers and regional telephone exchange stations, and one of the further regional telephone exchange stations is shown by the reference numeral 60, which is connected to the center 53 by optical fibers 61. The station 60 also has optical communication devices 60*a*, 60*b* and 60*c*.

The optical communication device 100 of FIGS. 1 to 4, for example, corresponds to the optical communication device 53*c* in FIG. 5. The optical communication device 200 of FIGS. 6 to 10C corresponds to the optical communication device 53*b* in FIG. 5, for example, which is connected to numerous telephone subscribers by the correspondingly numerous optical fibers 59.

Figure 1:
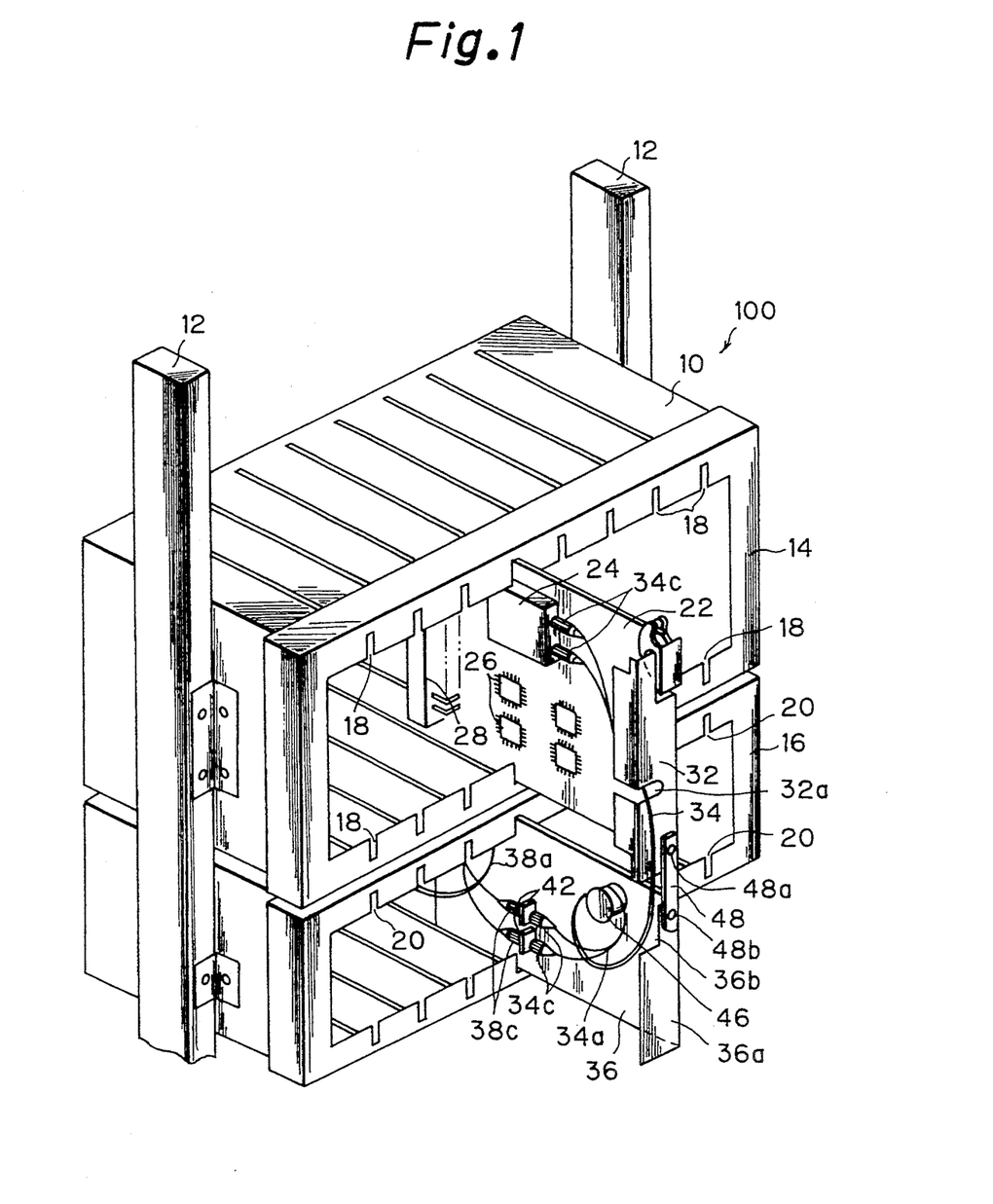
FIG. 1 is a perspective view of an optical communication device according to the first embodiment of the present invention.
Figure 2:
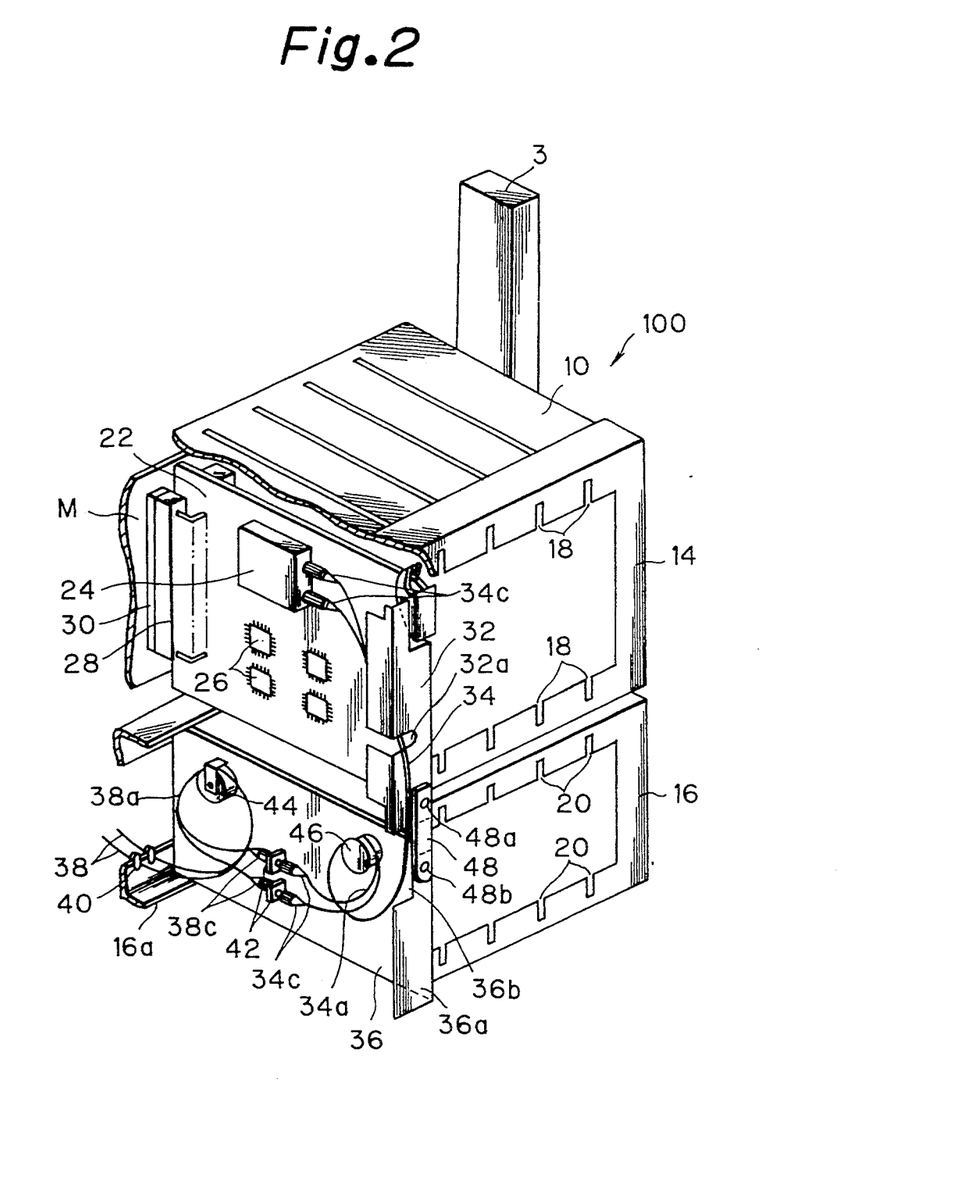
FIG. 2 is a partially broken perspective view of the optical communication device of FIG. 1.

In FIGS. 1 to 4, the optical communication device 100 comprises a housing 10 mounted on columns 12 and arranged in front of a telephone exchange unit M (FIGS. 2 and 3). The housing 10 comprises a horizontally elongated rectangular main shelf 14 and a horizontally elongated rectangular sub-shelf 16 arranged below the main shelf 14. The main shelf 14 and the sub-shelf 16 have pairs of guide rails 18 and 20, respectively. The guide rails 18 and 20 include top and bottom guide grooves in pairs, respectively. The guide rails 18 and 20 extend parallel to each other from the front to the rear of the main shelf 14 and the sub-shelf 16 along the horizontal top and bottom walls thereof, respectively. The guide rails 18 and 20 are arranged at a constant pitch and the guide rails 20 of the sub-shelf 16 are arranged in register with the guide rails 18 of the main shelf 14.

Unit plates 22 are inserted in the main shelf 14 in upright positions for engagement with the respective guide rails 18. Only one unit plate 22 is shown in the drawings for clarity, but it will be understood that a plurality of unit plates 22 can be inserted in the main shelf 14 for all of the guide rails 18. The unit plate 22 comprises a wiring circuit board and includes an optical module 124 and electronic components 26. The unit plate 22 also has, at the rear thereof, a connector 28 that is engageable with a corresponding connector 30 mounted on the unit M. Therefore, the unit plate 22 can be electrically connected to the unit M by a plug-in connection when the unit plate 22 is pushed to the unit M. The unit plate 22 has a front panel 32 having an aperture 32*a* so as to pass therethrough optical fibers 34 that have connectors 34*c* at one of the ends thereof for connection to the optical module 24.

Optical fiber supporting plates 36 are inserted in the sub-shelf 16 in upright positions for engagement with the respective guide rails 20. In this case too, only one optical fiber supporting plate 36 is shown in the drawings but it will be understood that optical fiber supporting plates 36 can be arranged for all of the guide rails 20. Each of the optical fiber supporting plates 36 supports two optical fibers 38 that are introduced from the rear of the sub-shelf 16. The optical fibers 38 are fixed to a rear beam 16*a* by rubber bushes 40 and include surplus length portions 38*a* coiled in a freely extendable manner.

In this embodiment, an adapter 42 is arranged at the central region of the optical fiber supporting plate 36 for connecting optical fibers 38 entering the sub-shelf 16 from the rear thereof with the optical fibers 34 exiting an aperture 36*b* of a front panel 36*a* of the sub-shelf 16. The adapter 42 receives connectors 34*c* and 38*c* at the ends of the optical fibers 34 and 38. Each of the optical fiber supporting plates 36 has drums 44 and 46 for supporting the optical fibers 34 and 38 having surplus length portions 34*a* and 38*a* coiled in a freely extendable manner at the opposite end regions of the optical fiber supporting plate 36. The drums 44 and 46 are located at a higher position on the optical fiber supporting plate 36 so that the surplus length portions 34*a* and 38*a* of the optical fibbers 34 and 38 freely hang from the drums 44 and 46, respectively.

A connecting member 48 mechanically interconnects the unit plate 22 and the optical fiber supporting plate 36. The front panel 32 of the unit plate 22 has a threaded hole 32*b* and the optical fiber supporting plate 36 has threaded hole 3*c* (see FIG. 4). The connecting member 48 is detachably fixed to the unit plate 22 and the optical fiber supporting plate 36 by screws 48*a* and 48*b* that engage with the threaded holes 32*b* and 36*c*, respectively.

Usually, the unit plate 22 and the optical fiber supporting plate 36 are inserted in the main shelf 14 and the sub-shelf 16, respectively, with the connecting member 48 mechanically interconnecting the unit plate 22 and the optical fiber supporting plate 36, as shown in FIG. 2. In this state, the surplus length portions 34*a* and 38*a* of the optical fibers 34 and 38 contain sufficient surplus lengths to allow the unit plate 22 and the optical fiber supporting plate 36 to move from this condition without damage to the optical fibers 34 and 38.

It is possible to simultaneously draw the unit plate 22 and the optical fiber supporting plate 36 from the main shelf 14 and the sub-shelf 16, as shown in FIG. 3. In this case, the surplus length portions 38*a* of the optical fibers 38 are extended so that the optical fibers 38 that are fixed by the rubber bushes 40 are not damaged.

It is also possible to draw the unit plate 22 only from the main shelf 14 after the connecting member 48 is detached, as shown in FIG. 4. In this case, the surplus length portions 34*a* of the optical fibers 34 are extended so that the optical fibers 34 that are fixed to the optical module 24 are not damaged.

It is also possible to insert one or both of the unit plate 22 and the optical fiber supporting plate 36 into the main shelf 14 and the sub-shelf 16, respectively, after services or the initial assembly of the device. In this case, the surplus length portions 34*a* and 38*a* of the optical fibers 34 and 38 are orderly arranged in correspondence with the optical modules 24, and it is not possible for the optical fibers 34 to be incorrectly connected to the optical modules 24.

In the second embodiment shown in FIGS. 6 to 10C, like elements are represented by reference numerals similar to those in the first embodiment and the description of such elements are made in brief.

Figure 6:
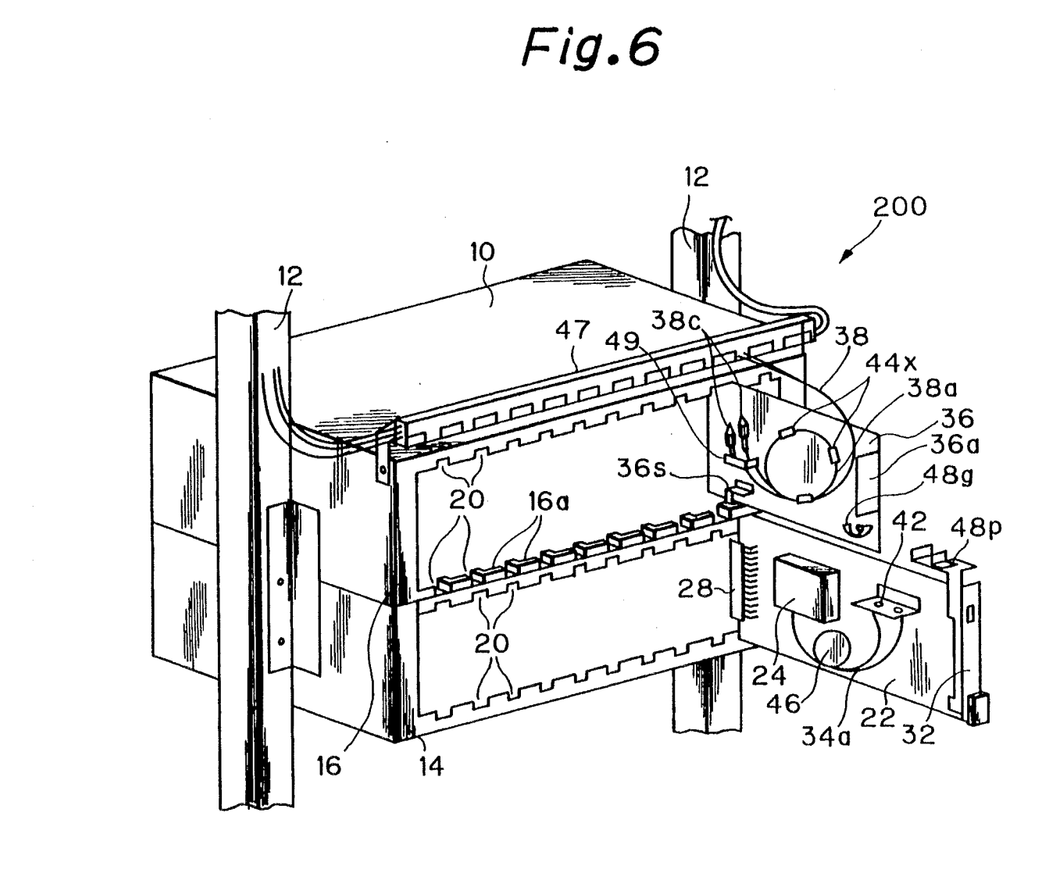
FIG. 6 is a perspective view of an optical communication device according to the second embodiment of the present invention.

The optical communication device 200 comprises a housing 10 mounted on columns 12 and arranged in front of a telephone exchange unit. M (not shown). The housing 10 comprises a main shelf 14 and a sub-shelf 16. The main shelf 14 and the sub-shelf 16 have guide rails 18 and 20, respectively, that extend parallel to each other along the horizontal top and bottom walls thereof, respectively. The guide rails 18 and 20 are arranged at a constant pitch and the guide rails 20 of the sub-shelf 16 are arranged in register with the guide rails 18 of the main shelf 14. In this embodiment, the sub-shelf 16 is arranged above the main shelf 14 and a guide tray 47 is arranged on the sub-shelf 16. Optical fibers 38 are laid along the columns 12 and introduced into the guide tray 47 from lateral side openings thereof. The optical fibers 38 exit from the front guide openings in pairs.

Unit plates 22 are inserted in the main shelf 14 in upright positions (only one unit plate 22 is shown in the drawings). The unit plate 22 comprises a wiring circuit board and includes an optical module 24 and electronic components (not shown). The unit plate 22 also has, at the rear thereof, a connector 28 that is engageable with a corresponding connector (not shown) mounted on the unit M. The unit plate 22 has a front panel 32 that carries a first connecting member 48p at the top thereof.

An adapter 42 is arranged on the unit plate 22 and optical fibers 34 extend between the optical module 24 and the adapter 42. A drum 46 is also arranged on the unit plate 22 for supporting the optical fibers 34 having surplus length portions 34a coiled in a freely extendable manner. The adapter 42 can receive the optical fibers 38.

Figure 9:
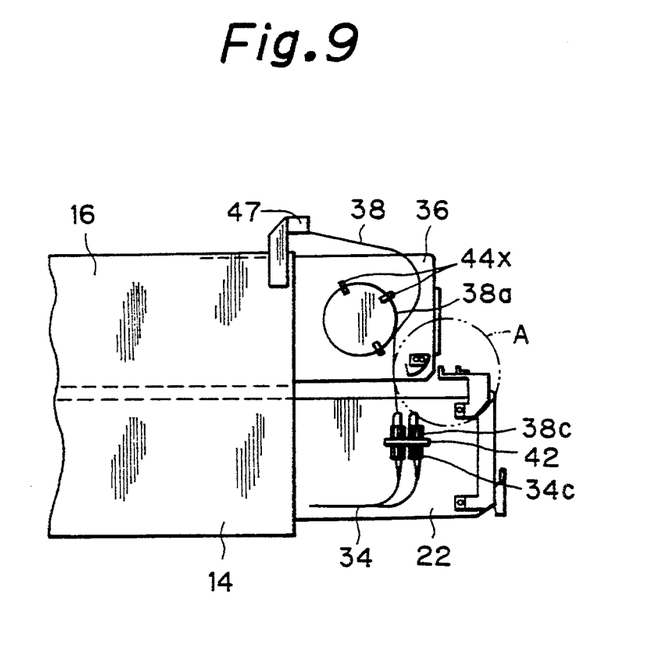
FIG. 9 is a side view of the device of FIG. 6 with the optical fiber supporting plate and the unit plate in drawn positions.

Optical fiber supporting plates 36 are inserted in the sub-shelf 16 in upright positions (only one optical fiber supporting plate 36 is shown in the drawings). The optical fiber supporting plate 36 supports two optical fibers 38 extending from the guide tray 47. The optical fiber supporting plate 36 has a plurality of supporting fingers 44x that allow the optical fibers 38 to be wound therearound for supporting the optical fibers 38 having surplus length portions 38a coiled in a freely extendable manner. The optical fiber supporting plate 36 also has a holder 49 for provisionally holding the end of the optical fibers 38. The connectors 38c of the optical fibers 38 can be inserted in the adapter 42 of the unit plate 22 by loosening the surplus length portions 38a, as shown in FIG. 9.

Figure 8:
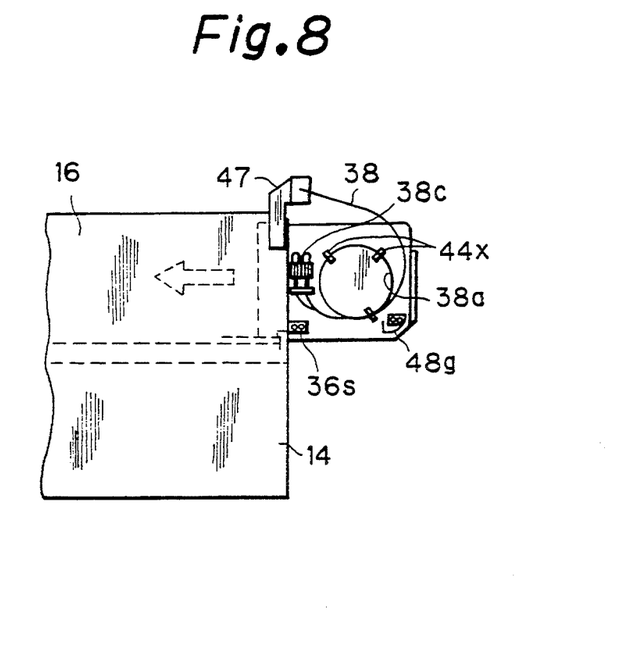
FIG. 8 is a side view of the device of FIG. 6 with the optical fiber supporting plate in a drawn position.

The optical fiber supporting plate 36 also has a stopper 36s near the rear end thereof for engagement with an abutment member 16a at the front of the bottom wall of the sub-shelf 16 so as to prevent the optical fiber supporting plate 36 from falling when it is drawn.

Figure 7:
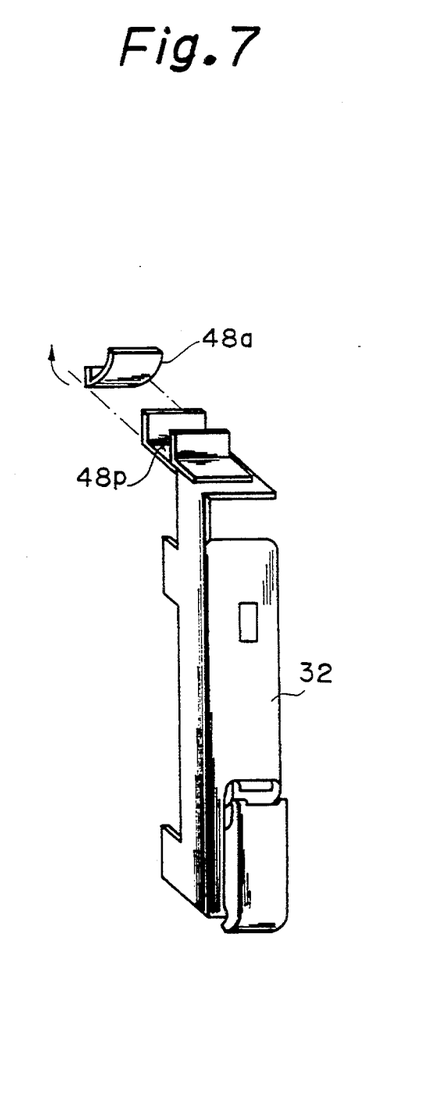
FIG. 7 is a perspective view of the connecting means of FIG. 6.

The optical fiber supporting plate 36 also has a second connecting member 48q at the bottom and near the front thereof. The shape and relationship of the first connecting member 48p of the unit plate 22 and the second connecting member 48q of the optical fiber supporting plate 36 are shown in FIG. 7. The second connecting member 48q comprises a spring hook and the first connecting member 48p comprises two fingers that pinch the second connecting member 48q therebetween.

Figure 10A:
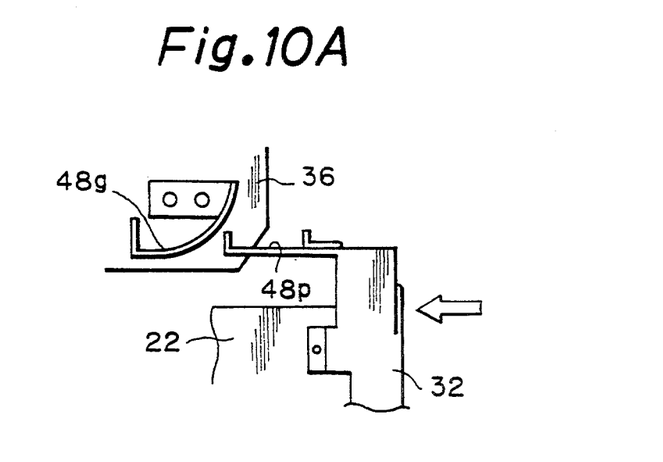
FIGS. 10A, 10B and 10C are views illustrating the connecting operations of the connecting members.
Figure 10B:
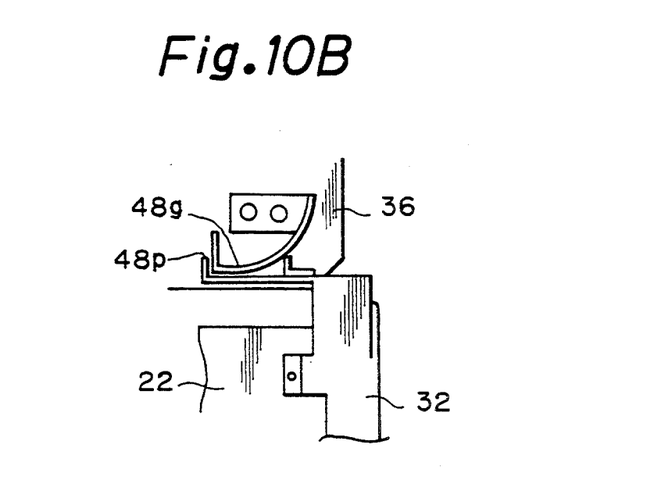
Figure 10C:
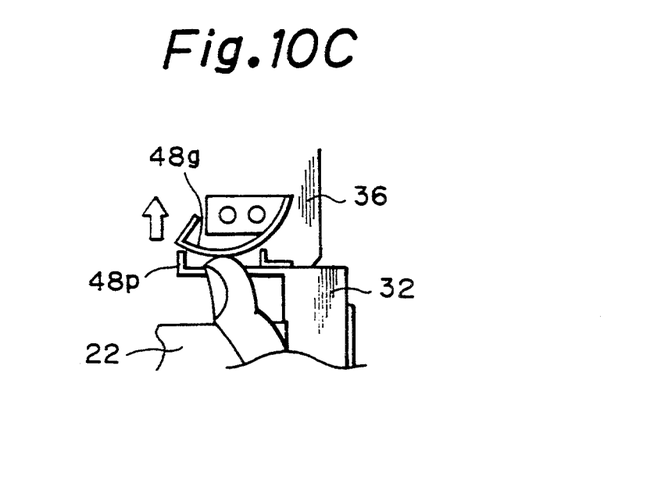

In the operation of the first and second connecting members 48p and 48q, the optical fiber supporting plate 36 is set in a partially inserted position and the unit plate 22 is then inserted after the connector 38a of the optical fiber 38 is connected to the adapter 42, as shown in FIG. 10A. By further inserting the unit plate 22, the first connecting member 48p engages with the second connecting plate 48q and the optical fiber supporting plate 36 then follows the movement of the unit plate 22, and when the optical fiber supporting plate 36 attains a fully inserted position, a further insertion of the unit plate 22 causes the first connecting member 48p to first lift the springy second connecting plate 48q and then catch it between the fingers of the first connecting member 48p, as shown in FIG. 10B. Accordingly, when the unit plate 22 is drawn for services or for repair, for example, the optical fiber supporting plate 36 is also drawn. It is then possible to release the connection between the first and second connecting members 48p and 48q by lifting the springy second connecting plate 48q and then pulling the unit plate 22.

In this case, the surplus length portions 34a and 38a of the optical fibers 34 and 38 are also orderly arranged in correspondence with the optical modules 24, and it is not possible for the optical fibers 34 to be incorrectly connected to the optical modules 24.

We claim:

1. An optical communication device comprising:
   a housing having a horizontal line, a first shelf having a plurality of guide rails extending parallel to each other and to the horizontal line, and a second shelf arranged in a vertically overlapping relationship with the first shelf and having a plurality of guide rails extending parallel to each other and to the horizontal line in register with the guide rails of the first shelf;
   a first set of unit plates comprising wiring circuit boards having optical modules, respectively; the unit plates being inserted in the first shelf in upright positions for drawable engagement with the respective guide rails; and
   a second set of optical fiber supporting plates inserted in the second shelf in upright positions for drawable engagement with each of the respective guide rails in a one-to-one correspondence; each of the optical fiber supporting plates having a means for supporting at least one optical fiber having a surplus length portion coiled in a freely extendable manner for connection to the optical module of each of the unit plates.

2. An optical communication device according to claim 1, wherein said device is a part of a telephone exchange device.

3. An optical communication device according to claim 1, wherein the first shelf is arranged above the second shelf.

4. An optical communication device according to claim 1, wherein the first shelf is arranged below the second shelf.

5. An optical communication device according to claim 1, wherein a means for supporting at least one optical fiber having a surplus length portion coiled in a freely extendable manner comprises a drum.

6. An optical communication device according to claim 5, wherein the optical fiber supporting plate has a central region, first and second opposite end regions, and at least one optical adapter at the central region for connecting at least one optical fiber from a first end region with another optical fiber from a second end region, and the drum for supporting at least one optical fiber having a surplus length portion coiled in a freely extendable manner is arranged at each of the opposite end regions.

7. An optical communication device according to claim 1, wherein a means for supporting at least one optical fiber having a surplus length portion coiled in a freely extendable manner comprises a plurality of supporting fingers allowing at least one optical fiber to be wound therearound.

8. An optical communication device according to claim 7, wherein at least one optical fiber has an end and a connector attached to said end, and the optical fiber supporting plate has a means for holding the end of at least one optical fiber.

9. An optical communication device according to claim 1, wherein a means is provided for mechanically connecting the unit plate and the optical fiber supporting plate.

10. An optical communication device according to claim 9, wherein the mechanical connecting means is a connecting member fixed to the unit plate and the optical fiber supporting plate.

11. An optical communication device according to claim 9, wherein the mechanically connecting means is a connecting member detachable from at least one of the unit plates and the optical fiber supporting plate.

12. An optical communication device according to claim 9, wherein the mechanically connecting means is a first connecting member attached to the unit plate and a second connecting member attached to the optical fiber supporting plate; the first and second connecting members being arranged such that one of the unit plates and the optical fiber supporting plate follows the other plate when same is moved.

* * * * *